Patented July 20, 1937

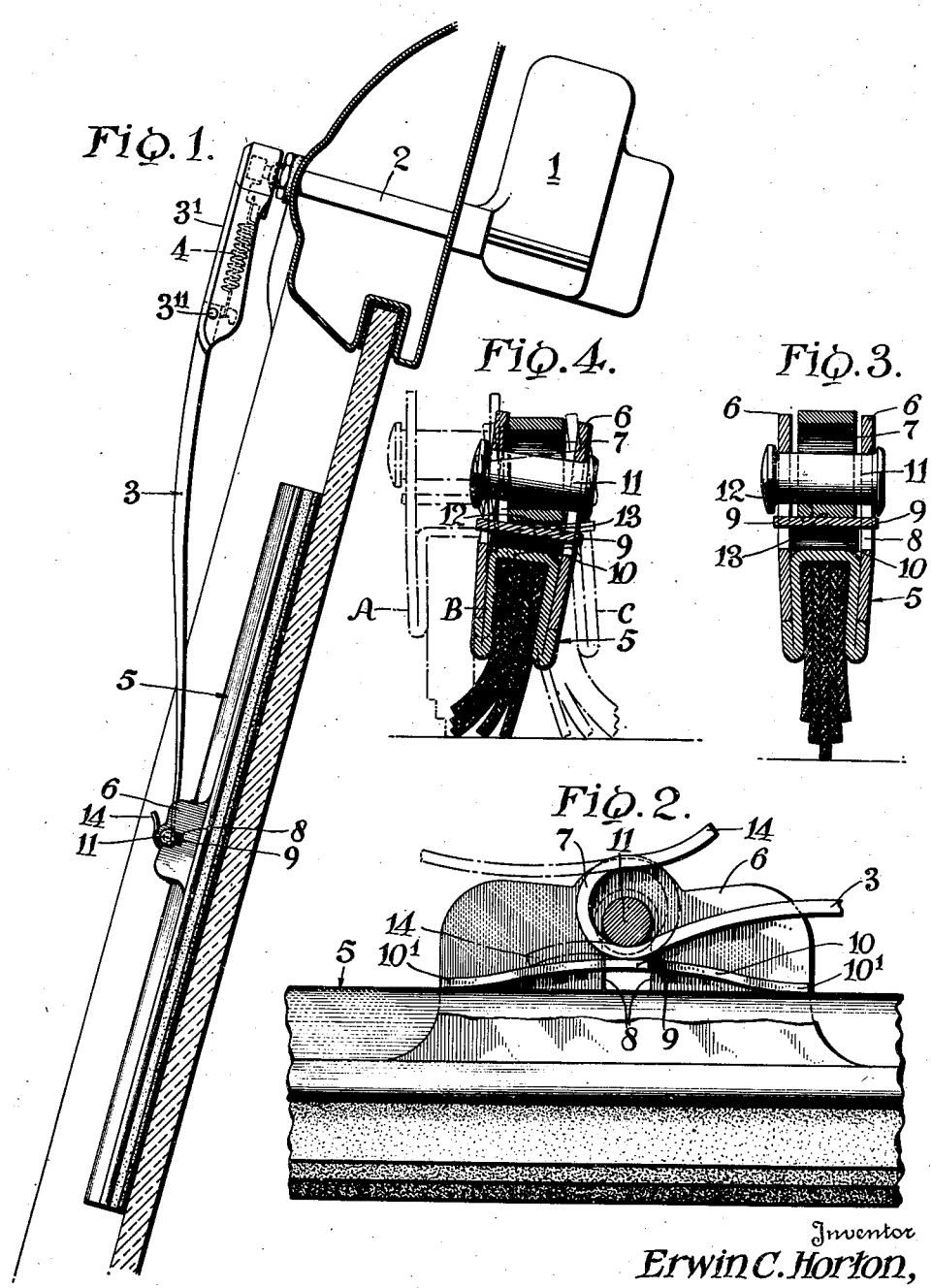

2,087,686

UNITED STATES PATENT OFFICE 2,087,686

WINDSHIELD CLEANER

Erwin C. Horton, Hamburg, N. Y., assignor to Trico Products Corporation, Buffalo, N. Y.

Application March 19, 1934, Serial No. 716,357

7 Claims. (Cl. 15—250)

This invention relates to a windshield cleaner and more particularly to the mounting connection between the wiper and the wiper carrying arm.

Generally the wiper or blade is connected to its carrying arm in such a manner as to permit the blade to tilt or flop over at the end of each stroke whereby the wiper will drag over the glass at the proper inclination to avoid chattering of the wiper on the glass. However, with this play or freedom in its mounting, the blade is usually inclined when at rest, and since the rubber wiping edge bends under the spring pressure of the carrying arm when the blade is tilted it will be obvious that through long periods of rest the wiping edge will become set and distorted and thereby impair the efficiency of the blade.

The present invention has for its object to provide an improved blade mounting by which the blade when at rest is resiliently urged to a position substantially at a normal to the windshield and into a definite relationship with the arm, whereby the wiping edge will prolong its period of efficiency and usefulness.

In the drawing:

Fig. 1 is a fragmentary sectional view of a windshield having a windshield cleaner mounted thereon and embodying the present invention.

Fig. 2 is a fragmentary enlarged view of the wiper with portions removed to more clearly illustrate the invention.

Fig. 3 is a cross sectional view through the wiper mounting showing the normal disposition of the wiper blade on the arm when at rest.

Fig. 4 is a similar view but illustrating the action of the parts when the wiper is operating on the glass.

Referring more particularly to the drawing, the numeral 1 designates a windshield cleaner actuator in the form of a motor which is designed to operatively move the actuating shaft 2 in a manner to reciprocate the articulated, wiper carrying arm 3, to which it is attached, back and forth over the windshield glass. The arm has an inner section 3' fixed to the shaft 2 and chambered to house a spring 4 which urges the outer arm section toward the glass about the axis of pin 3''. A wiper or blade 5 is connected to the outer end of the arm, as will now be set forth.

The arm mounting comprises a pair of opposed parts such as the ears 6 extending rearwardly from one of the connected parts, such as the blade 5 to receive therebetween the coupling portion 7 of the companion member. The ears are provided with guideways or slots 8 in which the lateral lugs 9 of a spring device 10 engage and find movement toward and from the back of the blade. A cross pin 11 extends between the ears and is supported thereby, while the preferably hook shaped coupling part 7 of the arm is engaged between the pin 11 and the spring device 10.

The blade or wiper is rendered self righting by having a transverse bearing on the hooked terminal and a cooperating bearing on the blade or a blade carried part, with the two bearings yieldably separable to permit the rocking of the blade but urged into full bearing contact to bring the blade to a position substantially normal to the windshield. To this end, the hooked coupling part or terminal 7 is provided with a transversely disposed bearing or face 12 for bearing on the transversely arranged bearing or face 13 of the spring device the line of contact between the bearings being substantially parallel to the glass. By reason of the resiliency of the spring device the two flat faces will be urged into full facial contact with one another. But by reason of the freedom of movement of the lugs 9 in their guideways 8 the spring device will be permitted to yield downwardly and thereby permit the blade to tilt or rock to one side or the other from its normal position. With the blade at rest, it will assume the normal position A in Fig. 4, or as shown in Fig. 3. Now when the wiper is moved over the glass the friction in its contact with the glass will cause the blade to drag at an inclination. Such lateral tilting or rocking is illustrated in Fig. 4 wherein the blade, in moving to the right, will incline to position B, Fig. 4, against the resilient urge of the spring 10, and then upon reverse movement of the arm the blade will assume a reverse inclination suggested by the dotted showing at position C of said view. Since the pressure of the spring device 10 is toward the pivot pin 11 the wiper will always be urged to a normal position and will be brought substantially to such position when the blade comes to rest.

The spring device 10 is herein shown as comprising a flat leaf spring bowed upwardly at its center, to which portion the guiding lugs 9 are joined, and having its extremities 10' bearing upon the back of the wiper blade, such as is depicted in Fig. 2.

To attach the wiper to the arm the bill 14 of the hooked terminal 7 is introduced and passed between the spring device 10 and the pin 11, as suggested by the dotted showing in Fig. 2, so as to engage the hook beneath said pin. It will be noted that the hooked part 7 is of sufficient size to freely receive the pin 11 and permit tilting movement of the blade and flattening action of the spring device toward the back of the blade and away from the outermost position of the pin which latter, according to the present disclosure, is mounted in the same guideways as are the lugs 9. Upon rocking of the wiper relative to the arm and laterally thereof, the central arched portion of the spring 10 will be forced downwardly as is clearly illustrated in Fig. 4, the guiding lugs 9 moving in their guideways. This movement is resisted by the resiliency of the spring so that when the arm comes to rest the blade, being relieved of the frictional dragging contact with the glass, will be restored to its normal position.

The spring 10 is shown as being inserted between the back of the blade and the hook 7 so as to provide a resilient cushion or pad on which the outer end of the arm may rest in urging the blade into wiping contact with the glass. This compound spring arrangement will insure protection for the blade against crushing the wiping edge into distortion.

The bearings or faces 12 and 13 are depicted as being straight across and substantially parallel to the glass surface, but in practice it is possible to obtain a fully equivalent action if these cooperating bearings are not straight across. They may incline to the normal or the faces may be irregular but nevertheless provide spaced points of contact by which the normal position may be defined. Furthermore, the cooperating bearing 13 may be provided on adjacent blade carried portions and yet obtain the self right action of the blade on the arm. Reference to the full facial contact is therefore used in an inclusive sense.

What is claimed is:

1. A wiper blade having spaced rearwardly extending guide parts, a pin extending between and connected to the guide parts for free movement toward and away from the back of the blade, and a spring yieldably holding the pin outwardly from the back of the blade and separable from the pin to permit the detachable engagement of an arm terminal about the pin and between the spaced guide parts.

2. A windshield cleaner comprising a wiper member, a carrying arm member, one member having spaced ears to receive the other member, a cross member connecting the ears and freely movable thereon toward and from the ear carrying member, said other member having a terminal hook detachably engaging the cross member and movable therewith between the ears, and means for yieldably holding the cross member with the engaged terminal outwardly from said wiper member whereby the latter has yielding wiping contact with the windshield surface.

3. A wiper mounting for windshield cleaners having a wiper carrying arm with an outer extremity, said extremity having a transverse flat face, a wiper having opposed walls for receiving the extremity therebetween, means loosely connecting the wiper walls to the extremity for pivotal movement about an axis transversely of the wiper, and spring means guided between said walls and bearing on the wiper, said spring means having a flat face resiliently held in full facial contact with the first flat face whereby to yieldably hold the wiper in a predetermined relation with the arm.

4. A windshield cleaner comprising a wiper carrying arm having a terminal hook, a wiper blade having a pair of spaced parts opposing each other and provided with outwardly extending guideways, a cross pin disposed in the guideways and about which the hook engages, a bowed leaf spring confined between the ears and having lugs engaging in the guideways, said spring finding support on the wiper blade and yieldably bearing outwardly against the hook to hold the pin adjacent the outer end of the guideways, said spring and hooked terminal having cooperating bearings tending to aright the blade substantially at a normal to the windshield and yieldable to permit lateral rocking of the blade.

5. A wiper mounting for windshield cleaners comprising a blade having opposed parts with guide means, a spring device supported by the blade and guided in its yielding movement by said guide means, and a wiper carrying arm detachably disposed between said opposed parts for relative free rocking therebetween and normally constrained against displacement therefrom, said arm having an integral transversely flat bearing, and said spring device having a flat bearing cooperating with the arm bearing and urged by said spring device into full bearing contact for holding the blade in a normal position with respect to the windshield glass.

6. A windshield cleaner comprising a wiper blade, a cross pin connected to the blade transversely across the back thereof for movement toward and away from said back, a bowed leaf spring interposed between the cross pin and the back of the blade and having its terminals supported by the blade with its bowed intermediate portion bearing outwardly against the pin, said bowed intermediate portion providing a guiding surface to facilitate the introduction of a wiper carrying arm between the spring and the cross pin during attachment of the blade to such arm.

7. A windshield cleaner comprising a wiper carrying arm, a wiper blade having opposed and outwardly extending parts, a transverse member slidably connected to said opposed parts for movement toward and from the wiping edge of the blade, said carrying arm having a part loosely engaging said transverse member and rockable between said opposed parts, and spring means for yieldably holding said transverse member and said arm part together whereby the wiping edge of the blade is yieldably urged toward the windshield surface.

ERWIN C. HORTON.